US008472983B1

(12) United States Patent
Kapoor et al.

(10) Patent No.: US 8,472,983 B1
(45) Date of Patent: Jun. 25, 2013

(54) SELECTIVE LOCATION-AWARE PAGING

(75) Inventors: Ankit Kapoor, Ghaziabad (IN);
Karthik Yagna, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/313,855

(22) Filed: Dec. 7, 2011

(51) Int. Cl.
*H04W 68/00* (2009.01)

(52) U.S. Cl.
USPC ........ 455/458; 455/433; 455/435.1; 455/445; 370/338; 370/329; 340/5.8

(58) Field of Classification Search
USPC .......... 455/433, 411, 404.1, 415, 458, 435.1, 455/445, 410, 426.1; 370/338, 329; 380/248; 340/5.8
See application file for complete search history.

(56) References Cited

U.S. PATENT DOCUMENTS

| | | | |
|---|---|---|---|
| 6,529,728 B1 * | 3/2003 | Pfeffer et al. | 455/418 |
| 6,609,004 B1 * | 8/2003 | Morse et al. | 455/456.5 |
| 6,909,903 B2 * | 6/2005 | Wang | 455/456.1 |
| 2002/0187793 A1 * | 12/2002 | Papadimitriou et al. | 455/458 |
| 2004/0030731 A1 * | 2/2004 | Iftode et al. | 707/205 |
| 2006/0077926 A1 * | 4/2006 | Rune | 370/328 |
| 2009/0104905 A1 * | 4/2009 | DiGirolamo et al. | 455/434 |

* cited by examiner

*Primary Examiner* — Mahendra Patel

(74) *Attorney, Agent, or Firm* — Wilmer Cutler Pickering Hale and Dorr LLP

(57) ABSTRACT

In one embodiment, a method for efficiently paging home nodes comprises receiving location information from a home node which indicates that a mobile device is attached to the home node, storing the location information in one or more data structures, wherein the location information includes an identity of the mobile device and an identity of the home node, mapping in the one or more data structures the identity of the mobile device to the identity of the home node, receiving a paging request message which contains the identity of a desired mobile device, identifying one or more associated home nodes through the mapping with the identity of the desired mobile device, and forwarding the paging request message to the one or more associated home nodes.

18 Claims, 13 Drawing Sheets

SELECTIVE LOCATION-AWARE PAGING

FIELD OF THE DISCLOSURE

The present disclosure relates generally to a method and system for providing selective location-aware paging of mobile devices in a telecommunications network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology.

The range of the wireless communication technology can vary depending on the deployment. A femto cell transceiver is similar in coverage to a wireless local area network (WLAN, e.g., Wi-Fi) access point and can be used to provide network access over a short range. Home nodes, often containing femto cell transceivers, can be deployed in homes and businesses to provide supplemental network access when the range or position of the other wireless communication technology of a network is inadequate. User devices may attach to home nodes to gain network access in these areas. Home nodes connect to the network through a home node gateway that interfaces with the rest of the cellular wireless network.

DESCRIPTION OF EXAMPLE EMBODIMENTS

Overview

Figure 1:
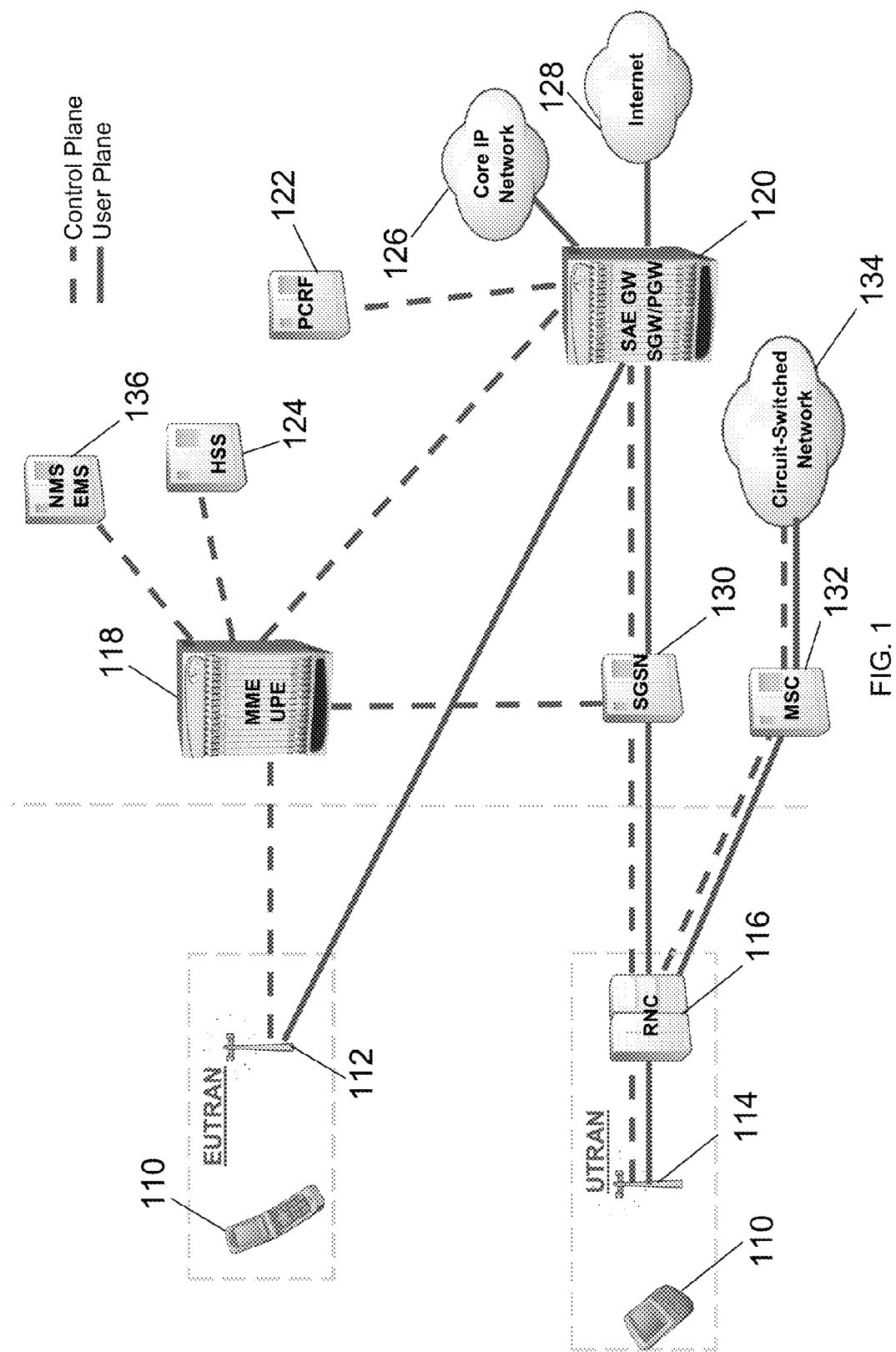
FIGS. 1-2 illustrate a communication network in accordance with some embodiments.

Certain embodiments disclose a method for efficiently paging home nodes comprising receiving location information from a home node which indicates that a mobile device is attached to the home node, storing the location information in one or more data structures, wherein the location information includes an identity of the mobile device and an identity of the home node, mapping in the one or more data structures the identity of the mobile device to the identity of the home node, receiving a paging request message which contains the identity of a desired mobile device, identifying one or more associated home nodes through the mapping with the identity of the desired mobile device, and forwarding the paging request message to the one or more associated home nodes.

Example Embodiments

This disclosure relates generally to providing selective location-aware paging of mobile devices in communications networks. Mobile devices such as smartphones and cell phones have continued to proliferate at a rapid pace. At the same time, other home-based wireless network technologies, such as Wi-Fi and Femto, have been used to provide high bandwidth availability over a much shorter range than traditional wireless macro networks. In some cases, these home-based wireless network technologies can be connected into a service provider's core network, which is the same network that is used by the service provider's traditional wireless networks. This connection allows the home-based wireless network to function as an extension of the service provider's traditional wireless network.

Mobile devices are increasingly relied on by users for more functionality. At the same time, mobile applications are increasingly developed to provide users with large amounts of data and up-to-the-minute notifications. Despite the increased strain that these applications place on mobile networks, users continue to expect service that is fast, reliable and available wherever they may bring their mobile devices. Mobile users expect the same quality of service from home-based wireless networks as they do from traditional wireless macro networks. To achieve this quality, efficiency at various levels of the network is important, such as accurately routing data to the mobile device. When data messages are sent duplicatively to many transceivers, but only one transceiver includes the intended recipient, bandwidth is wasted. It is more efficient to resolve the location of the intended recipient more accurately so only one or fewer messages are sent. The more accurate delivery contributes directly to the quality of the users' experience. This disclosure describes selectively forwarding mobile device paging requests to improve accuracy and efficiency within a home-based wireless network.

In order to connect to a home-based wireless network, a home node can be used. A home node is a short-range wireless transceiver (e.g., a femto transceiver) often installed in a home or business location to expand wireless network coverage to new such locations or improve upon existing coverage in a location. Mobile devices are able to connect to home nodes, and, in turn, each home node can connect to a home node gateway. A home node gateway provides a connection point from the home-based wireless network into the core network of a service provider. A home node gateway is responsible for receiving data that is sent from mobile devices to a connected home node, and communicating that data on to the core network for delivery to destination nodes, such as other mobile devices. Data can include, for example, packets of information for uses such as voice over IP (VoIP), email, video, or voice signals. Home node gateways also communicate data back from the core network to mobile devices. As with other nodes, the selective communication of messages at a home node gateway is important for network efficiency as a whole.

Home node gateways may serve many home nodes and each of those home nodes may serve many mobile devices. To conserve the resources of those home nodes and mobile devices, home node gateways can selectively forward messages from the core network. To do this, home node gateways can track which home nodes serve which mobile devices. Based on this tracking, the home node gateway can forward messages intended for delivery to a mobile device only to the home nodes which are likely to be serving that device. The resources of the other home nodes, as well as the network bandwidth between the home node gateway and those home nodes, can thus be conserved.

Home node gateways may act as a concentrator of home node connections and of mobile device connections. When the core network locates a particular mobile device, it initiates a paging procedure by sending a paging message. This paging message is sent by the core network to the home node gateway known by the core network to be serving the desired mobile device. The home node gateway is responsible for forwarding the paging request from the core network to the home nodes that it serves. Those home nodes then broadcast the paging message. The paging message is received by all mobile devices in range. If the desired mobile device receives this broadcast, it responds to the core network and the paging procedure is successful. This disclosure describes how a home node gateway can track the mobile devices served by each of its home nodes and selectively forward paging messages. In some embodiments, this tracking is accomplished by reading the content of location update messages periodically sent from a mobile device to core network. These messages are delivered to the core network by the home node gateway as forwarded by a home node. Thus, the home node gateway can read each location update message as it relays the message, inferring that the sending mobile device is served by the forwarding home node.

FIG. 1 illustrates a network diagram in accordance with some embodiments. FIG. 1 illustrates a universal mobile telecommunication system (UMTS) network along with a LTE network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, a home subscriber server (HSS) 124, a core IP network 126, an Internet connection 128, a Serving General packet radio service Support Node (SGSN) 130, a mobile switching center (MSC) 132, a circuit-switched network 134 and a network management system (NMS)/element management system (EMS) 136. The MME 118, SGSN 130, and SAE GW 120 can be implemented in a gateway as described below. The SAE GW 120 can include a serving gateway (SGW) as well as a packet data network gateway (PGW). In some embodiments, the SGW and PGW can be implemented on separate network devices. The main component of the SAE architecture is the Evolved Packet Core (EPC), also known as SAE Core. The EPC includes the MME, SGW and PGW components. The MSC 132 controls and forwards circuit-switched traffic between the RNC 116 and the circuit-switched network 134. The user equipment (UE) can include a mobile phone, a laptop with wireless connectivity, a netbook, a smartphone, or any other wireless device.

MME 118 is a control-node for the LTE access network. The MME 118 is responsible for UE 110 tracking and paging procedures including retransmissions. The MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME 118 also provides the control plane function for mobility between LTE and 2G/3G access networks with the S3 interface terminating at the MME 118 from the SGSN 130. The MME 118 also terminates the S6a interface towards the home HSS for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g. parameters of the IP bearer service and network internal routing information. The SGW also performs replication of the user traffic in case of lawful interception. The PGW provides connectivity to the UE 110 to external packet data networks by being the point of exit and entry of traffic for the UE 110. A UE 110 may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 (CDMA 1X and EvDO).

The NMS/EMS 136 can provide management of the operation, administration, maintenance, and provisioning of a networked system. Operation deals with keeping the network (and the services that the network provides) up and running smoothly, and includes monitoring to detect problems and minimize disruptions on the network. Administration deals with keeping track of resources in the network and how they are assigned. Maintenance is concerned with performing repairs and upgrades—for example, when equipment must be replaced, when a router needs a patch for an operating system image, when a new switch is added to a network. Provisioning is concerned with configuring resources in the network to support a given service. For example, this might include setting up the network so that a new customer can receive service. Functions that are performed as part of network management accordingly include controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, and accounting management. An element management system (EMS) consists of systems and applications that manage network elements (NE) on the network element management layer (NEL) of the Telecommunication Management Network model.

The location of the user equipment (UE) attached to a core network is tracked by the core network so that the UE can be reached when desired. Each UE updates the core network on its location by sending Location Update messages to the core network. A UE sends these messages both periodically and when the UE detects that it has entered a new location. Each Location Update message contains the location of a UE. The location of a UE is defined by the location of the base station through which the UE is connected to the network. In a UMTS network in accordance with some embodiments, this location is defined by a Location Area, which is a collection of base stations through which the core network knows that a UE is reachable. Each Location Area has a Location Area Code (LAC) that is used to identify that Location Area in a Location Update message. If a UE is in a particular Location Area, it may move throughout that area without the need to perform a Location Update informing the core network of its new location.

A Routing Area is a subdivision of a Location Area applicable to packet-switched UEs. A Routing Area defines a UE's location more precisely than a Location Area. Each Routing Area has a unique Routing Area Code (RAC). In some embodiments that use Routing Areas, each Location Update message contains the LAC and RAC information of the base station to which the sending UE is currently attached. These Location Update messages keep the core network up-to-date with the location of the sending UE so that the core network can properly page that UE and direct voice and data traffic towards that UE. Each UE transmits a Location Update message when it detects the broadcast of a new location identifier (e.g., a new LAC and RAC). Thus, neighboring base stations may be assigned distinct location identifiers to trigger the more frequent transmission of Location Update messages. For example, if a base station and all of its neighboring base station are assigned distinct LAC and RAC identifiers, a UE moving from that base station to any of its neighboring base stations will transmit a Location Update message. More frequent Location Update messages allows the core network to maintain more timely UE tracking In some cases, the collective range of the nodeBs, eNBs, or other base stations that provide radio access to the network is not sufficient to reach all possible UE locations. If these gaps in network coverage are undesirable, the coverage may be supplemented by the installation of home nodes (HNs). For example, an individual interested in providing network coverage to their home or place of business that otherwise has insufficient network access (e.g., through nodeB or eNB coverage) may be interested in installing a home node or group of home nodes to provide such access. In some embodiments, home nodes are femtocell transceivers with coverage similar to a Wi-Fi (WLAN) access point. Home nodes can thus be used to provide additional network access over a short range.

Home nodes provide a radio interface to in-range UEs through which subscribers can use voice, data, and other services provided by the network operator. A UE may attach to a home node to access the network in lieu of attaching to a nodeB or eNB. Each home node connects to a home node gateway (HN-GW) to receive network services. Each home node gateway may serve many home nodes. In some embodiments, the connection between a home node and a home node gateway occurs across an Internet connection. The home node gateway presents itself to the core network as a concentrator of home node connections in a comparable fashion to how a UMTS network's radio network controller presents itself to the core network as a concentrator of nodeBs. As with other base stations, each home node has an associated location identifier (e.g., a LAC and a RAC). When a UE is attached to a home node, its location is defined by the location of that home node. One or more home nodes may share the same location. However, as described above, neighboring home nodes served by a home node gateway may be assigned different location identifiers to trigger more frequent Location Update messages from a UE as it moves amongst those home nodes. Therefore, when a UE moves and, as a result, becomes attached to a new home node, its location may or may not change.

In some embodiments, home nodes can register with home node gateways in one of three access modes: (1) Closed mode, (2) Hybrid mode or (3) Open mode. Closed Mode home nodes provide services to the mobile subscribers that are part of an associated Closed Subscriber Group (CSG). A Closed Subscriber Group defines a group of mobile subscribers that are permitted to access a home node. Home node operators may configure their Closed Subscriber Group to permit, for example, only their employees to use a corporate home node. A mobile subscriber that is part of the Closed Subscriber Group for a home node may access the network through that home node. Hybrid Mode home nodes provide services to mobile subscribers that are part of an associated Closed Subscriber Group and to other mobile subscribers. Home nodes in Open Mode provide services to any mobile subscriber.

Figure 2:
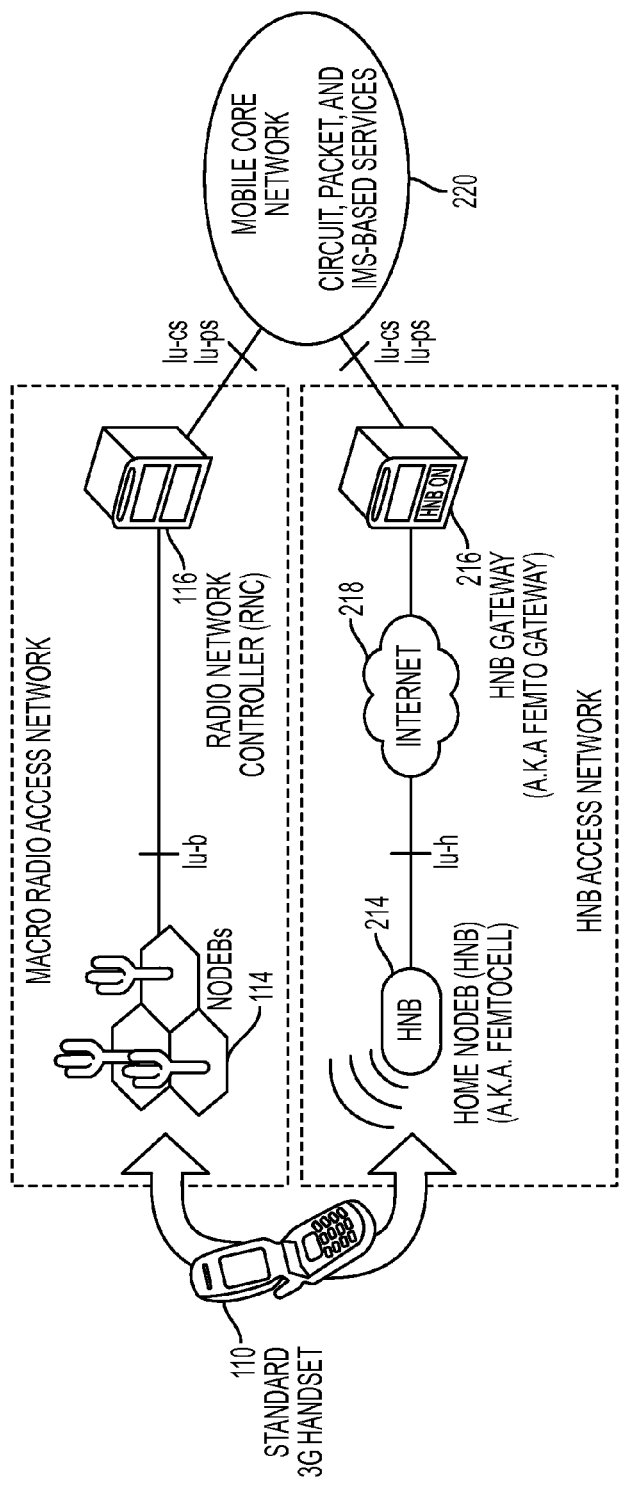

FIG. 2 illustrates parallel radio access networks that provide network connectivity to user equipment (UE) either through a macro radio access network or a home node access network in accordance with some embodiments. FIG. 2 includes user equipment (UE) 110, a collection of nodeBs 114, a radio network controller (RNC) 116, a home node B (FINE) 214, a home node B gateway 216, an Internet connection 218, and a core network 220. The UE 110 is a standard 3G handset that can be used to make calls or transmit data. The collection of nodeBs 114 provides radio network access to the UE 110. The RNC 116 provides the nodeBs 114 with core network access. The home node B 214 is a type of home node and provides radio network access to the UE 110 over a small range. The home node B gateway 216 is a type of home node gateway and provides the home node B 214 with core network access. The Internet connection 218 provides a connection between the home node B 214 and the home node B gateway 216.

The core network 220 is the central part of a telecommunications network and provides services to the UEs 110 that are connected to the network. The macro radio access network comprises the collection of nodeBs 114 and the RNC 116. The macro radio access network connects the UE 110 to the core network 220. The home node access network comprises the home node B 214, the home node B gateway 216 and the internet connection 218. The home node access network, like the macro radio access network, connects the UE 110 to the core network 220. Thus, the UE 110 is able to communicate with the core network 220 through either the macro radio access network or the home node access network. These networks can be deployed in parallel, with the nodeBs 114 providing large-scale radio coverage to the UE 110 and the home node Bs 214 providing smaller range radio coverage in any undesirable gaps in nodeB 114 coverage.

When the core network contacts a UE it initiates a paging procedure by sending a Paging Request message. This message contains an identifier for the desired UE. In some embodiments, the identifier is the desired UE's International Mobile Subscriber Identity (IMSI). This Paging Request message may also contain paging area information (e.g., a location identifier such as a LAC and RAC) which identifies the location of the desired UE. If the last known location of a desired UE is a home node served by a home node gateway, the message is sent to that home node gateway. When an existing home node gateway receives a Paging Request message that contains, for example, a LAC and RAC, the home node gateway forwards the message to all of the home nodes that it serves having that LAC and RAC. For Paging Request messages without paging area information, an existing home node gateway forwards the message to all of the home nodes that it serves, regardless of their paging area. Each of these home nodes then broadcasts the Paging Request message to UEs in range on a reserved radio paging channel. Each UE attached to a home node periodically monitors the reserved radio paging channel of that home node to receive these requests. If a UE recognizes itself as the target of a Paging Request message, it then initiates the creation of a signaling connection with the core network via its associated home node and home node gateway. In this way, a UE that is attached to a home node can be located by the core network with a high probability.

Existing implementations of the above paging mechanism can create high load over the home node/home node gateway interface because an unnecessarily large number of home nodes registered with a home node gateway may be contacted when that home node gateway receives a Paging Request message from the core network. For example, if the Paging Request message does not contain a LAC and RAC identifying the location of the UE, bandwidth is used to contact every home node registered with the home node gateway. Even for Paging Request messages that do contain a LAC and RAC, bandwidth is used to contact all of the home nodes having this LAC and RAC, when the UE is attached to a single home node. The existing implementations also create high load over home node paging channels because every home node that is contacted is instructed to broadcast the Paging Request message, even if the requested UE is not attached to that home node. In some implementations using a Closed or Hybrid access mode, the home node gateway conserves signaling bandwidth by using a Closed Subscriber Group list included in some Paging Request messages. The home node gateway filters using the list to find a subset of home nodes to which to forward the paging message. This optimization conserves signaling bandwidth because only a subset of home nodes are contacted and then only those home nodes use their paging channel. However, this optimization can not be used where the core network, the home nodes or the UEs are not capable of using Closed Subscriber Groups or with home nodes operating in the Open access mode.

Figure 3A:
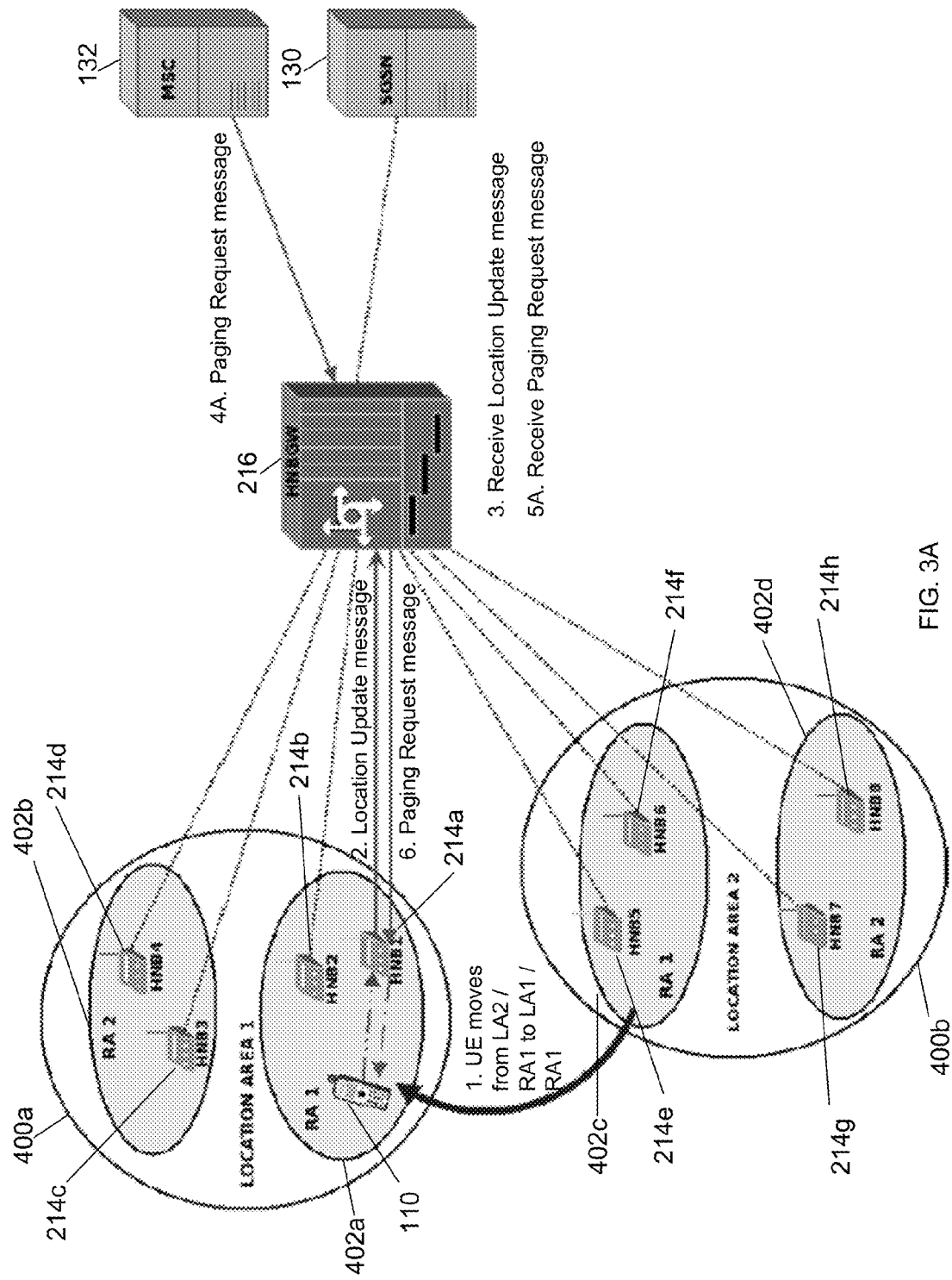
FIGS. 3A-3B illustrate a method of selectively paging a mobile device in accordance with some embodiments.
Figure 3B:
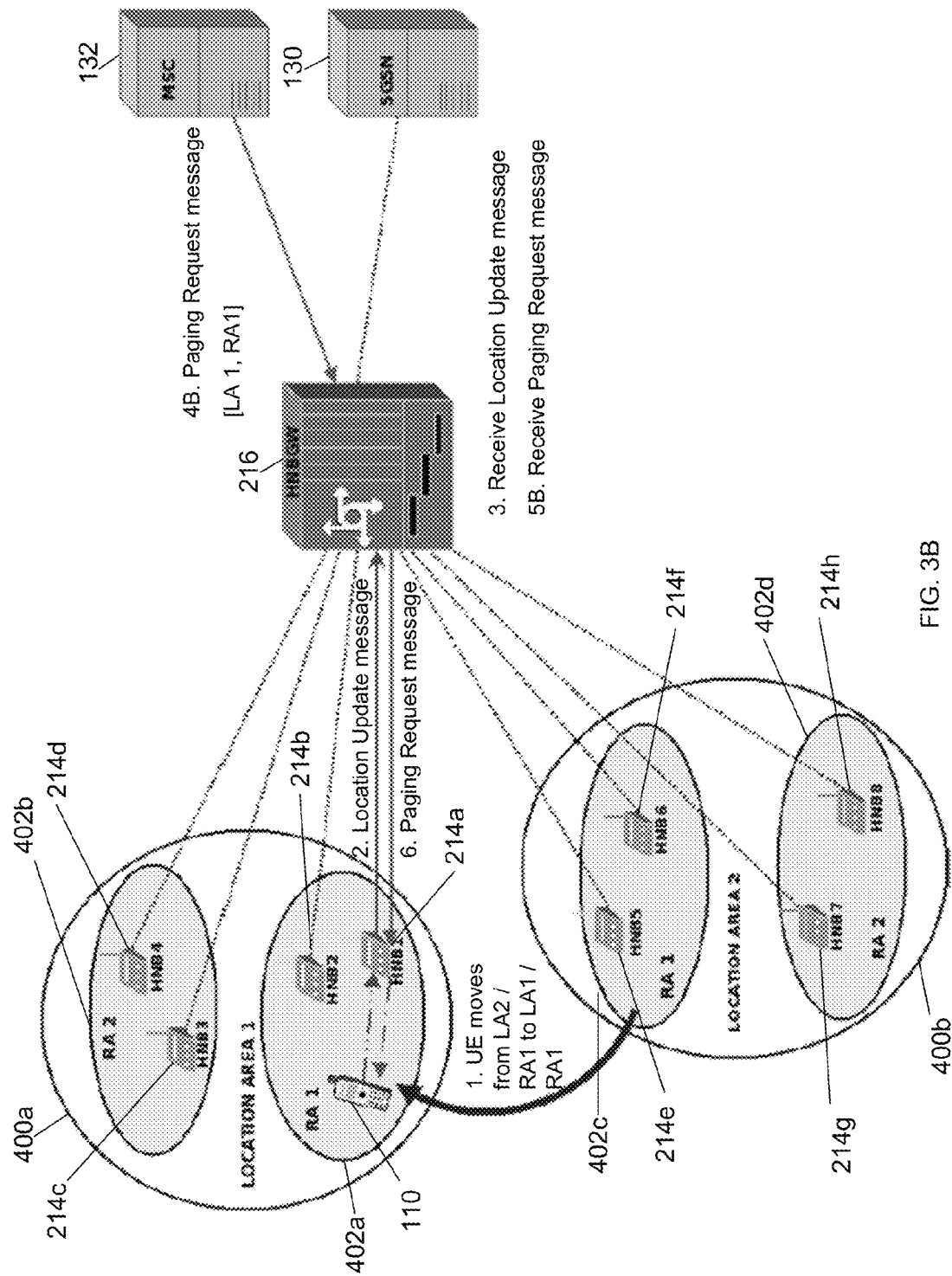

FIGS. 3A and 3B illustrate a method of receiving at a home node gateway location information in accordance with certain embodiments. The home node gateway receives the location information from an updating home node, which indicates that a UE is attached to that updating home node. Location information may include any information that tends to indicate the node or nodes through which a UE may access a core network including information such as cell id, an address, physical coordinates, relative location to other devices, or grouping of devices by area. The home node gateway can store that location information in a UE/home node location mapping and then selectively forwarding paging requests to home nodes based on this mapping in accordance with some embodiments. Each home node gateway's UE/home node location mapping maps the identity of a UE to the particular home node to which it is attached. The illustrated embodiment is part of a UMTS network wherein the home node gateway is a home node B gateway and the home nodes are home node Bs. In other embodiments the network may be a LTE network wherein the home node gateway may be a home evolved node B gateway and the home nodes may be home evolved node Bs.

FIGS. 3A and 3B include a UE 110, eight home nodes Bs 214a-214g, a home node B gateway (HNB-GW) 216, a SGSN 130, a MSC 132, two Location Areas 400a and 400b and four Routing Areas 402a-402d. The UE 110 is a standard 3G handset with UMTS network connectivity. The home node Bs 214a-214h are each a type of home node used with a UMTS network. The home node B gateway 216 is a type of home node gateway used with a UMTS network. The SGSN 130 and MSC 132 are core network nodes that provide network connectivity to the home node B gateway 216. The two location areas 400a and 400b are each geographical areas. The four routing areas 402a-402d are geographical subdivisions of the location areas 400a and 402b.

Each of the eight home node Bs 214a-214h are located in one of the four Routing Areas 402a-402d and each of these Routing Areas 402a-402d are located in one of the two Location Areas 400a and 400b. Home node B 214a and home node B 214b are located in Routing Area 402a, which is located in Location Area 400a. Home node B 214c and home node B 214d are located in Routing Area 402b, which is also located in Location Area 400a. Home node B 214e and home node B 214f are located in Routing Area 402c, which is located in Location Area 400b. Home node B 214g and home node B 214h are located in Routing Area 402a, which is also located in Location Area 400b. Based on this topology, each of the eight home node Bs 214a-214h is located in a specific Location Area and Routing Area. The home node B gateway 216 connects to each of the home node Bs 214a-214h using an internet connection and relays data between the home node Bs 214a-214h and the core network SGSN 130 and MSC 132 nodes.

In Step 1, the UE 110 moves from the radio coverage range of home node B 214e to the radio coverage range of home node B 214a. The UE 110 determines that such a move occurred by receiving radio location information broadcast by home node B 214a. In Step 2, the UE 110 attaches to home node B 214a. During this attach, the UE 110 determines the Location Area and Routing Area of home node B 214a. The UE 110 transmits a Location Update message to home node B 214a. Home node B 214a forwards this Location Update message to the home node B gateway 216. The Location Update message contains the UE's 110 new location information and the IMSI of UE 110. The location information is the location of home node B 214a and comprises the identities of Location Area 400a and Routing Area 402a.

In Step 3, the home node B gateway 216 receives the Location Update message and forwards it to the core network. In addition to forwarding the message, the home node B gateway 216 reads the Location Update message. From this message, the home node B gateway 216 identifies the location information and IMSI of the sending UE 110. The home node B gateway 216 updates its UE/home node location mapping based on this information. The information indicates that the UE 110, as identified by the included IMSI, is presently attached to the home node B 214a that forwarded the Location Update message. The home node B gateway 216 can then update its UE/home node location mapping information to indicate that the UE 110 is no longer attached to other home node Bs. By reading each Location Update message in this fashion, the home node B gateway 216 keeps an up-to-date record of the UEs attached to each served home node B.

In both Step 4A of FIG. 3A and Step 4B of FIG. 3B, the MSC 132 sends a Paging Request message to the home node B gateway 216 indicating that the core network seeks to establish a circuit-switched network connection with the UE 110. The Paging Request message includes the IMSI of the UE 110. In Step 4A, the Paging Request message does not contain any LAC or RAC identifying the location of the UE 110. In contrast, the Paging Request message sent in Step 4B contains the LAC and RAC of the UE 110. In this case, the specified Location Area is Location Area 400a and the specified Routing Area is Routing Area 402a. Thus, the home node B gateway 216 may narrow the set of possible home node Bs to which the UE 110 is attached to a set containing home node B 214a and home node B 214b without using the included IMSI or its UE/home node location mapping.

In both Step 5A of FIG. 3A and Step 5B of FIG. 3B, the home node B gateway 216 searches its UE/home node location mapping to identify the home node B to which the UE 110 is attached. In Step 5A, the home node gateway searches its entire UE/home node location mapping to identify the home node to which the desired UE 110 is attached. In Step 5B, the home node gateway is able to narrow its search using the Location Area and Routing Area specified in the Paging Request message. Thus, in this case, the home node B gateway 216 only searches its UE/home node location mapping for home node B 214a and home node B 214b. In either case, the home node B gateway 216 determines that the UE 110 is attached to home node B 214a. In Step 5B, the home node B gateway 216 identified a proper subset (a set containing only home node B 214a) of the set of possible home node Bs having the LAC and RAC contained in the Paging Request message. Set A is a proper subset of Set B if every element of Set A is also an element of Set B and Set B has at least one element that is not an element of Set A.

In Step 6, the home node B gateway 216 forwards the Paging Request message to home node B 214a only. The home node B gateway 216 has used its previously stored UE/home node location mapping information to selectively page only the home node B to which the desired UE is attached. This selective paging saves network bandwidth between the home node B gateway 216 and the home node Bs to which the message was not forwarded.. As well, because these home node Bs never receive the Paging Request message sent from the MSC 132, processing power and radio bandwidth is conserved by these home node Bs.

Figure 4:
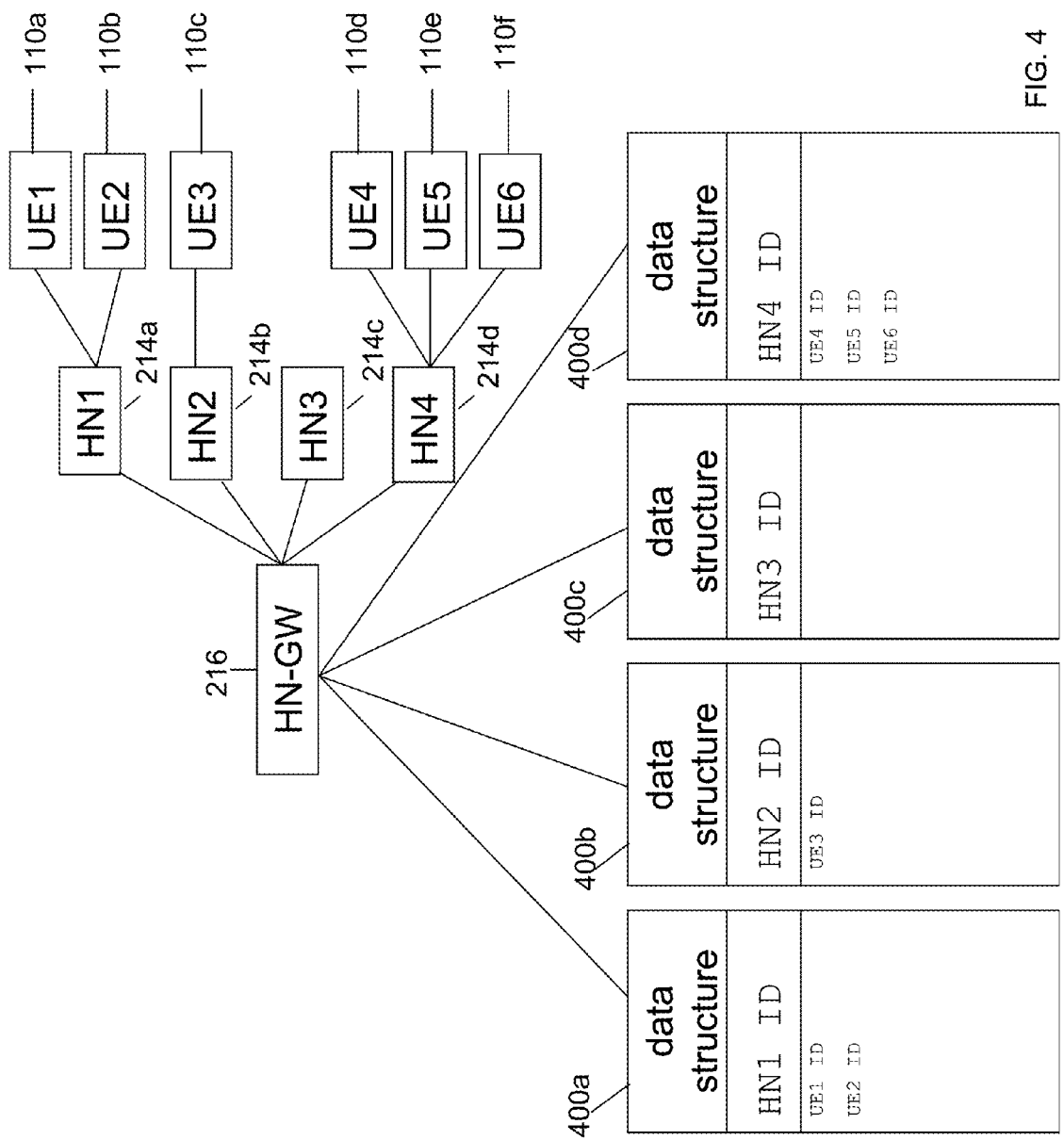
FIG. 4 illustrates a logical view of a data structure for storing mobile device location in accordance with some embodiments.

FIG. 4 illustrates a logical view of a group of data structures for storing UE/home node location mapping information in accordance with some embodiments. Each data structure is associated with one of the home nodes served by a home node gateway. Each data structure stores the identity of the UEs that are attached to that home node. FIG. 4 includes a home node gateway 216, four home nodes 214a-214d, six articles of user equipment (UEs) 110a-110f and four data structures 400a-400d. The home node gateway 216 serves the four home nodes 214a-214d. Home node 214a serves attached UEs 110a and 110b. Home node 214b serves attached UE 110c. Home node 214c does not have any attached UEs. Home node 214d serves attached UEs 110d-110f. Other embodiments may involve different numbers of home nodes, UEs and data structures. For example, some embodiments may use a single data structure to store all of the UE/home node location mapping information for a single home node gateway.

Data structures 400a-400d each store the UE/home node location mapping information associated with one of the home nodes 214a-214d. Each data structure 400a-400d stores a home node identifier and a collection of UE identifiers. The content of data structure 400a indicates that home node 214a is currently serving UEs 110a and 110b. The content of data structure 400b indicates that home node 214b is currently serving UE 110c. Data structure 400c has no content, which indicates that UE 214c is not currently serving any UEs. The content of data structure 400d indicates that home node 214d is currently serving UEs 110d-UEs 110f. For each additional home node that is served by the home node gateway 216, the home node gateway 216 creates an additional data structure to store the identities of the UEs that attach to that home node.

In some embodiments, the data structures used by a home node gateway to store UE/home node location mapping information are counting bloom filters (CBFs). A counting bloom filter is a space-efficient data structure that stores information identifying the elements of a set with N possible elements. This information is stored in an array of length M, with each array position storing a counter of length B bits. Each counter in the array is initialized with the value of zero. For each of the N possible elements of the set, K independent hash functions map that element to K positions in the array.

When an element is added to a set stored by a counting bloom filter, all of the counters stored in the K array positions mapped to that element by the K hash functions are incremented by one. When an element is to be removed from a set stored by a counting bloom filter, all of the counters stored in the K array positions mapped to that element by the K hash functions are decremented by one. When a counting bloom filter is queried to determine if a specified element is a member of the set being stored by that counting bloom filter, each of the counters stored in the K array positions mapped to that element by the K hash functions are checked. If any of these counters is equal to zero, then the counting bloom filter responds that the element is not a member of the set. If none of the counters are equal to zero, then the counting bloom filter responds that the element is a member of the set with some false-positive probability.

The false-positive probability that exists when a counting bloom filter is queried to determine whether a specific element is a member of a set exists because a counting bloom filter can use an array with fewer positions than possible elements in the set (e.g., M can be less than N). The result of using an array that does not have a counter for every possible element of the set is that multiple elements are mapped to single array positions by the hash functions. As such, a counter associated with an element may be non-zero not because that element was added to the set but rather because a different element that also maps to that counter was added. This false-positive probability is tolerated in exchange for reduced memory usage as compared to using an array that has separate counters for every possible set element. When there are many possible set elements, the reduction in memory usage can be significant and a low false-positive probability can be achieved.

Figure 5:
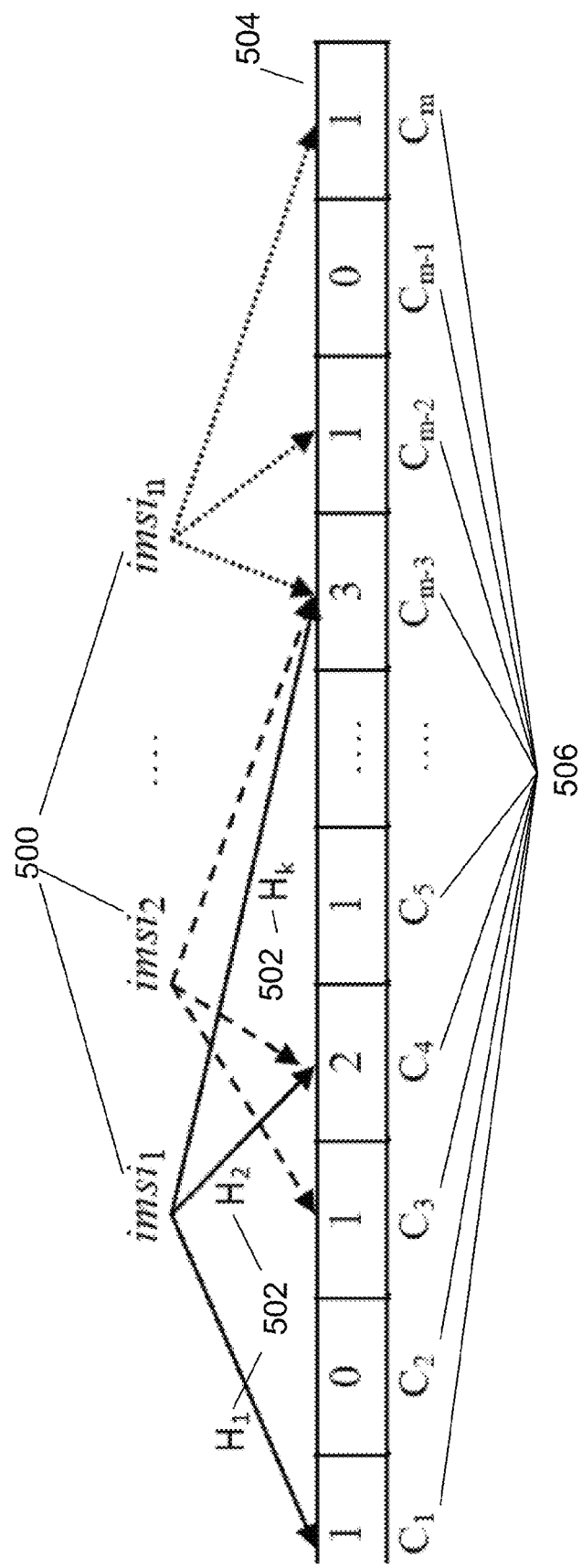
FIG. 5 illustrates a logical view of a counting bloom filter data structure in accordance with some embodiments.

FIG. 5 illustrates a logical view of a counting bloom filter data structure in accordance with some embodiments. The counting bloom filter is used by a home node gateway to store UE/home node location mapping information for a particular home node served by that home node gateway. In FIG. 5, each UE is identified by its IMSI. FIG. 5 includes a set of possible IMSI values 500, a set of independent hash functions 502, an array 504, and a set of counters 506. There are N possible IMSI values 500, K hash functions 502 and one array 504 which contains M counters 506. When a home node gateway adds a UE's IMSI 500 to the counting bloom filter for its attached home node, it begins by determining the K values that result when the IMSI value 500 is used as input to the K hash functions 502. Each of these K resultant values is used as an index to the array 504. Each of the K indexed counters 506 is incremented by one. When a home node gateway checks if a particular IMSI value 500 is stored in a counting bloom filter, it again determines the K values that result when the IMSI 500 is used as input to the K hash functions 502. Each of the K counters 506 that are indexed by these K values are checked by the home node gateway and, if all of these counters 506 are equal to zero, the home node gateway determines that the specified IMSI value 500 is not stored in the counting bloom filter. If any of the K values are greater than zero, the home node gateway determines that the specified IMSI value 500 is stored in the counting bloom filter, with some false-positive probability.

Figure 6:
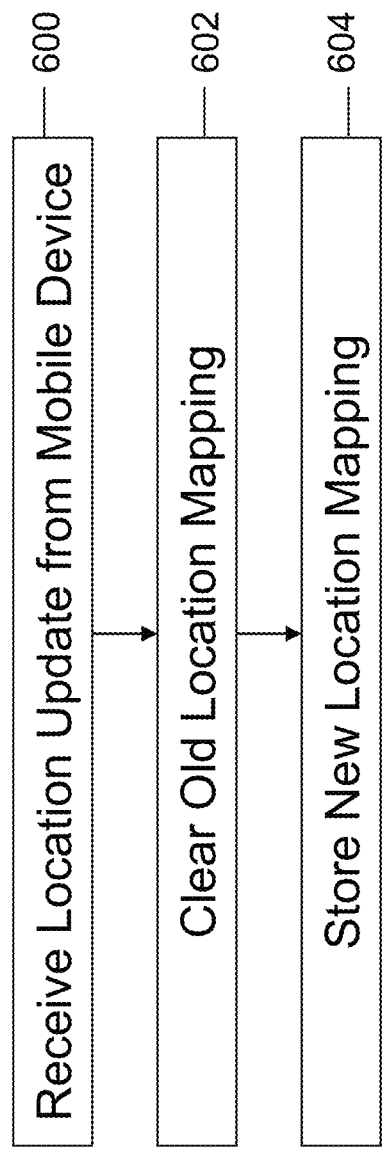
FIG. 6 is a flow chart illustrating a method of storing mobile device location information using counting bloom filters in accordance with some embodiments.

FIG. 6 illustrates a method of updating UE/home node location mapping information upon receipt of a Location Update message in accordance with some embodiments. In these embodiments, the home node gateway stores this information using one data structure for each home node that is served by that home node gateway. Each of these data structures stores the set of UEs that are attached to the home node. In some embodiments, UEs are uniquely identified by their IMSI and so it is the IMSIs of the UEs that are attached to the home node that are stored in the data structure. In Step 600 the home node gateway receives a Location Update message from a home node. This message was forwarded by the home node from a UE. The Location Update message includes the UE's identifier and the home node's location. In Step 602 the home node gateway identifies other home nodes with the indicated location and removes the identifier of the UE from the sets stored by the data structures associated with those home nodes. In some home node deployments, the other home nodes are assigned the same location as the sending home node because they are geographically close to the sending home node. In other deployments, geographically nearby home nodes are assigned different locations. In Step 604, the home node gateway adds the identifier of the UE to the set stored by the data structure for that home node. Following this procedure, the home node gateway's UE/home node location mappings are up-to-date for the UE and for the home nodes having the same location as the home node that forwarded the Location Update message.

Figure 7:
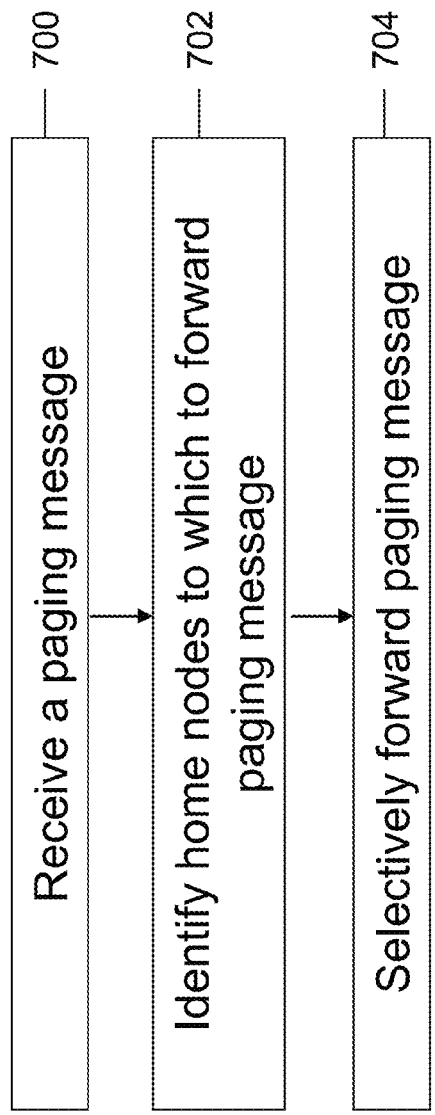
FIG. 7 is a flow chart illustrating a method of selectively paging a mobile device in accordance with some embodiments.

FIG. 7 illustrates a method of using a home node gateway's UE/home node location mapping information to selectively page only home nodes that this information tends to indicate are attached to a desired UE in accordance with some embodiments. Using this method, a home node gateway is able to respond more efficiently to paging requests received from the core network. In Step 700, the home node gateway receives a Paging Request message. The Paging Request message contains the identifier of a target UE. In some embodiments, the Paging Request message contains location information of the UE that is known to the core network. In Step 702, the home node gateway checks its UE/home node location mapping to identify home nodes that are likely attached to the UE identified by the Paging Request message. In Step 704, the home node gateway forwards the paging request only to those home nodes so identified.

The home node gateway may narrow the location data that it checks for the desired UE by using other information contained in the Paging Request message. In some embodiments, upon receipt of a circuit-switched Paging Request message, the home node gateway only checks home nodes which belong to the Location Area specified in the request for the target UE's identifier. In other embodiments, upon receipt of a packet-switched Paging Request message, the home node gateway only checks home nodes which belong to the Location Area and Routing Area specified in the request for the target UE's identifier.

Figure 8:
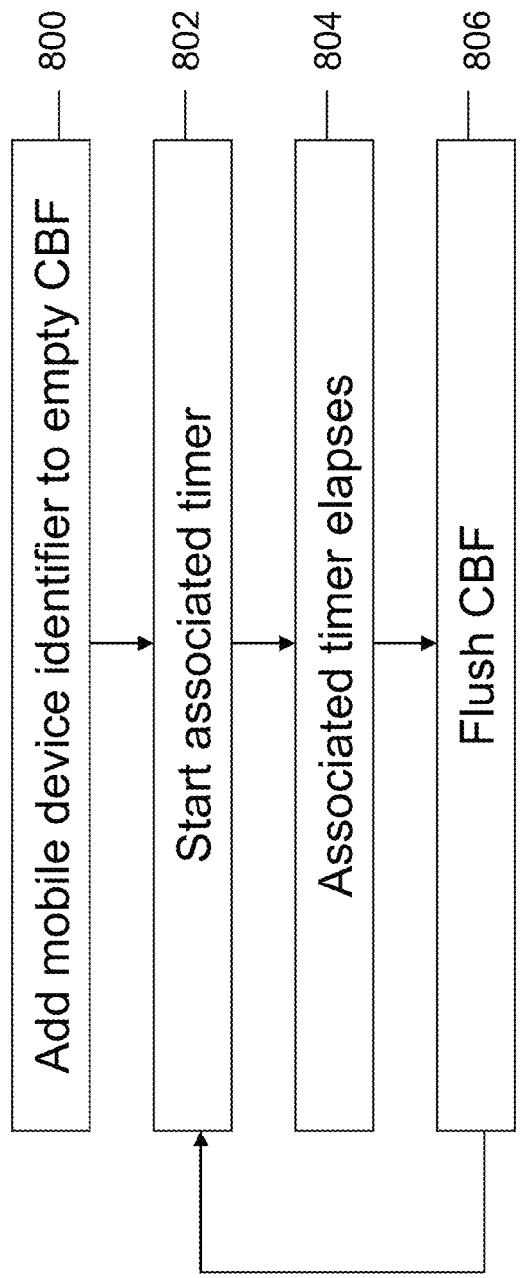
FIGS. 8-9 are flow charts illustrating methods of periodically flushing the mobile device location data structures in accordance with some embodiments.

FIG. 8 illustrates a method of periodically flushing the counting bloom filters used to store UE/home node location mapping to remove stale location information in accordance with some embodiments. This periodic flushing is accomplished by associating a timer with each counting bloom filter. In Step 800, a UE's identifier is added to an empty counting bloom filter in response to a Location Update message sent by that UE. In this illustration, this is the first UE identifier to be stored by the counting bloom filter. In Step 802, the counting bloom filter's associated timer is started. In Step 804, the timer runs for a predetermined amount of time T. In Step 806, once the timer has run for time T, all of the location information stored by the associated counting bloom filter is flushed by setting each of the counting bloom filter's counters to zero. Following Step 806, the method returns to Step 802.

T, the amount of time that passes before a counting bloom filter is flushed once its associated timer has started running, is typically set to a value slightly greater than the amount of time between periodic Location Updates sent by the UEs. In some embodiments T is 50 minutes and so each counting bloom filter with a started timer is flushed every 50 minutes. In this way, the identifiers of the UEs that cease sending periodic Location Update messages (e.g., if the UEs are turned off or are no longer attached to any home node served by the home node gateway) are flushed from all counting bloom filters to which they had previously been added within 50 minutes of such a cessation.

Figure 9:
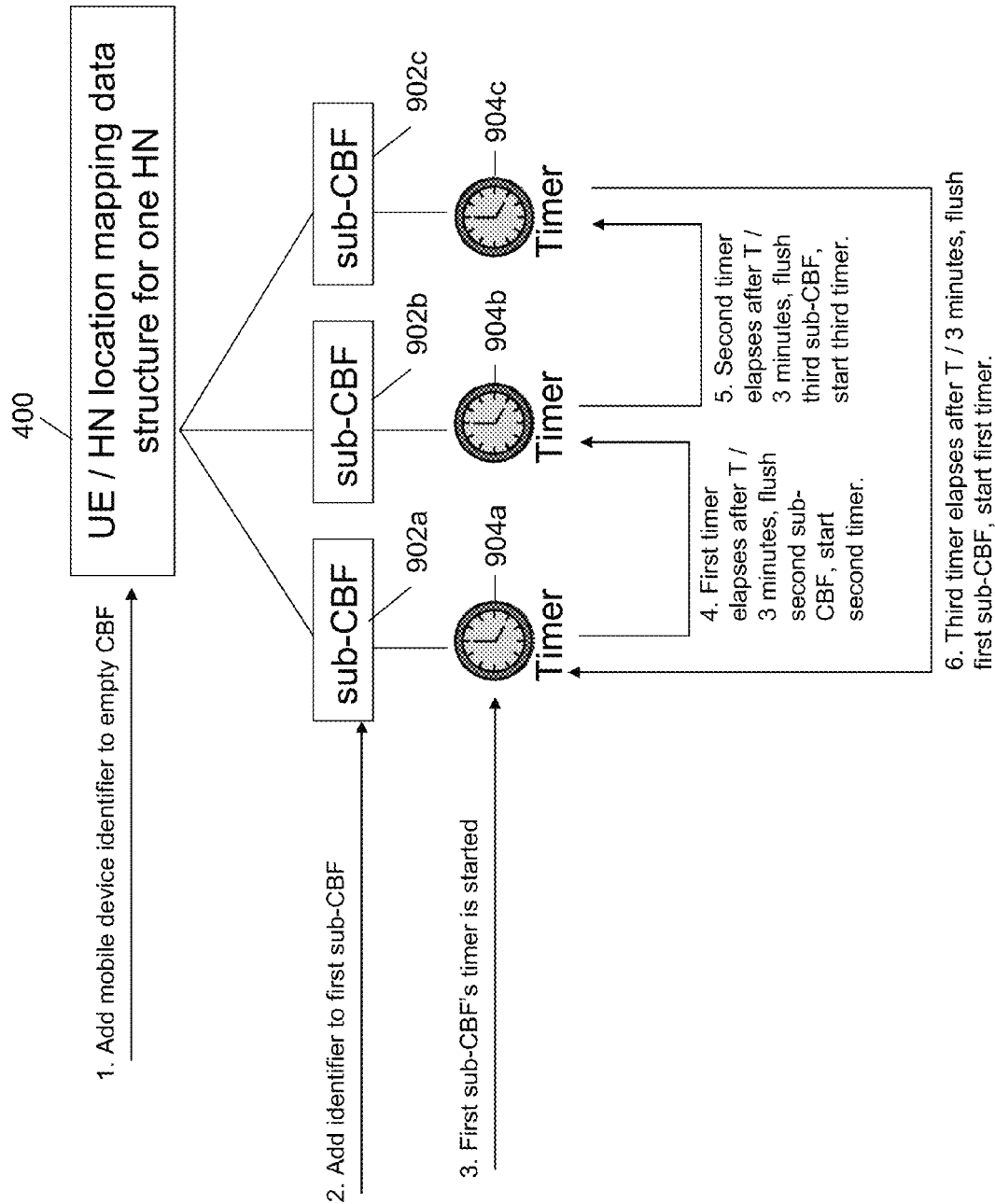

FIG. 9 illustrates a method of sub-dividing the flushing interval, in accordance with some embodiments that use counting bloom filters to store UE location information and that periodically flush the counting bloom filters to remove stale location information as in FIG. 8. FIG. 9 includes a UE/home node location mapping data structure 400, three sub-counting bloom filters 902a-902c and three timers 904a-904c. The UE/home node location mapping data structure 400 stores the UE/home node mappings for a single home node. A home node gateway stores one UE/home node location mapping data structure 400 for each home node that it serves. The location mapping data structure 400 comprises the union of data stored by the three sub-counting bloom filters 902a-902c. Each sub-counting bloom filter 902a—902c has an associated timer 904a-904c.

As illustrated in FIG. 9, the flushing interval T has been sub-divided into a sequence of 3 smaller sub-intervals each of length T/3. For example, if T is 50 minutes then each sub-interval is 50/3 minutes long (16 minutes and 40 seconds). If the flushing interval has been sub-divided into N sub-intervals, there would be N sub-counting bloom filters associated with each home node. In FIG. 9 there are 3 sub-intervals and so there are 3 sub-counting bloom filters 902a-902c. These sub-counting bloom filters 902a-902c are ordered (first sub-counting bloom filter 902a, then sub-counting bloom filter 902b, then sub-counting bloom filter 902c) and each has its own associated timer 904a-904c.

In Step 1, the home node gateway receives a Location Update message from a home node. This is the first Location Update message received by the home node gateway and so the UE/home node location mapping data structure 400 contains no mappings. Thus, the three sub-counting bloom filters 902a-902c are empty. In Step 2, the sending UE's identifier is added to the first of the ordered sub-counting bloom filters 902a. In Step 3, that sub-counting bloom filter's timer 904a is started, making the first sub-counting bloom filter 902a the active sub-counting bloom filter. In Step 4, after the first sub-interval elapses, the first sub-counting bloom filter's timer 902*a* is stopped and the second sub-counting bloom filter 902*b* becomes the active sub-counting bloom filter. At this point, the second sub-counting bloom filter 902*b* is flushed and the second sub-counting bloom filter's timer 904*b* is started. From this point until Step 5, upon receipt of a Location Update messages the sending UE's identifier is added to the second sub-counting bloom filter 902*b* because it is the active sub-counting bloom filter. In Step 5, the second sub-counting bloom filter's timer 904*b* elapses, the third sub-counting bloom filter 902*c* is flushed and the third sub-counting bloom filter's timer 904*c* is started. At this point until Step 6, the third sub-counting bloom filter 902*c* is the active sub-counting bloom filter to which incoming UE identifiers are added.

The process carries on in this fashion until the final sub-interval elapses, at which point the first sub-counting bloom filter is flushed, the first sub-counting bloom filter's timer is started again and the first sub-counting bloom filter becomes the active sub-counting bloom filter again. Thus, in Step 6, when the third sub-counting bloom filter's timer 904*c* elapses, the first sub-counting bloom filter 902*a* is flushed and so the UE identity that was stored in Step 2 is cleared. At any point in time, upon receipt of a Location Update message, the sending UE's identifier is added to the active sub-counting bloom filter (the sub-counting bloom filter that was most recently cleared).

In some embodiments, when a Location Update message is received from the home node for which the UE/home node location mapping data structure 400 exists as in Step 2, the UE's identifier is also removed from all of the sub-counting bloom filters associated with home nodes that share the indicated location. When determining the home node to which to forward a Paging Request message, the home node gateway checks all of the sub-counting bloom filters belonging to all of its UE/home node location mapping data structures for a record of the target UE's identifier, regardless of which sub-counting bloom filter is currently active in those data structures.

Without a system of sub-counting bloom filters and sub-intervals in accordance with FIG. 9, it is possible that a UE will send a periodic Location Update shortly before the flushing interval elapses. When the flushing interval elapses, the information stored for this UE at the time of this Location Update is cleared and the home node gateway will not be able to determine which home nodes to page. The information used to page that UE efficiently will not be available again until that UE's next periodic Location Update.

For example, in embodiments without sub-counting bloom filters and without sub-intervals in accordance with FIG. 9, a UE may send periodic Location Update messages every 45 minutes and a home node gateway may be configured with a flushing interval T of 60 minutes. In this case, if the UE sends a Location Update message 45 minutes into the flushing interval then the stored location information will only be kept for 15 minutes. At that point the location information will be flushed and will not be restored for 30 more minutes (at the time of the UE's next periodic Location Update message), resulting in 30 minutes during which the home node to which that UE is attached will not be identifiable by the home node gateway.

Using the method as illustrated in FIG. 9, the time interval during which the information identifying the location of a UE is unavailable because it has been flushed is reduced or eliminated. For example, a home node gateway may be configured to use a flushing interval of 60 minutes with 3 sub-intervals (each of 20 minutes) and a UE may send Location Update messages every 45 minutes. In this case, if the UE sends a Location Update message 45 minutes into the flushing interval, this message will be processed 5 minutes into the third sub-interval and so the UE's identifier will be stored by the third sub-counting bloom filter (the active sub-counting bloom filter for the third interval). After the third sub-interval elapses 15 minutes later, the first sub-interval begins again and only the first sub-counting bloom filter is flushed. At this point, the home node to which the UE is attached can be identified by accessing the third sub-counting bloom filter. 30 minutes later (10 minutes into the second sub-interval, 45 minutes after the last Location Update) the UE sends another periodic Location Update and so the UE's identifier will be stored by the second sub-counting bloom filter for the associated home node. 10 minutes later, the second sub-interval elapses and the third sub-counting bloom filter is flushed. At this point, the identifier stored as a result of the first Location Update message is flushed but the UE's location remains accessible in the second sub-counting bloom filter as stored following the second Location Update message. In this example, there is no period of time during which the home node to which the updating UE is attached can not be found in at least one sub-counting bloom filter.

The number of sub-counting bloom filters (N) and the length of each sub-interval (T/N) may be configured so that certain information is not flushed before it is restored. If P is the time period between a UE's periodic Location Update transmissions, N and T may be configured so that (N−1) multiplied by T/N is greater than P. Configuring N and T in this manner will allow a periodic Location Update message to refresh a UE's identifier prior to that identifier being flushed from the sub-counting bloom filter in which it was previously stored. For example, if the time period between periodic updates from a UE (P) is 60 minutes, then setting N equal to 5 and T equal to 100 minutes will achieve this result. In this example, each sub-counting bloom filter is flushed once every 100 minutes but the flushed identifiers may be restored into a different sub-counting bloom filter every 60 minutes.

Figure 10:
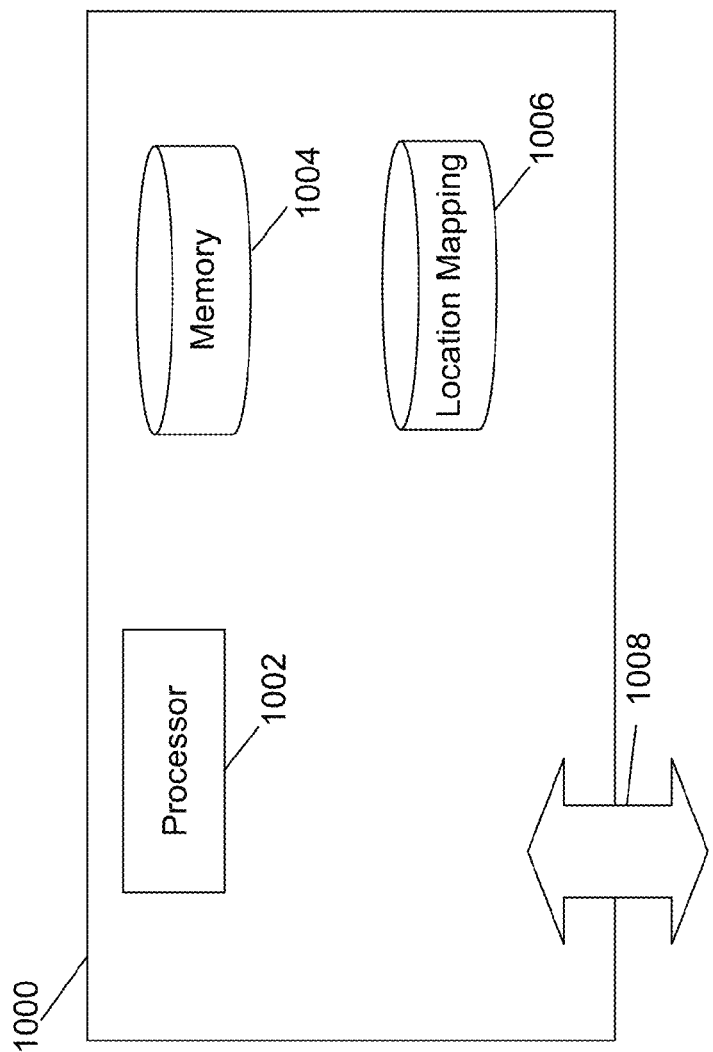
FIG. 10 illustrates a logical view of a home node gateway in accordance with some embodiments.

FIG. 10 illustrates a logical view of a home node gateway 1000 in accordance with some embodiments. The gateway 1000 can include one or more of a processor 1002, a memory 1004, a location mapping data structure 1006 and an interface 1008. An interface 1008 can provide an input and/or output mechanism to communicate with other network devices. The interface 1008 can provide communication with other gateways, application servers, and user equipment, as well as other core network nodes to send and receive data. The interface 1008 can be implemented in hardware to send and receive signals in a variety of mediums, such as optical, copper, and wireless, and in a number of different protocols some of which may be non-transient. A processor 1002 runs software which uses the interface 1008 and the memory 1004 such as a tangible, non-transitory computer readable medium, a programmable read only memory (PROM), or flash memory. The processor 1002 may be any computer chip that is capable of executing program instruction streams that are part of a software program. The processor 1002 may have multiple cores for executing multiple streams of program instructions simultaneously.

The processor 1002 may also have multiple sub-processors which are optimized for executing particular categories of program instructions and are controlled by the processor 1002. The memory 1004 is capable of storing and retrieving program instructions, program data, or any other data that is used by the processor 1004. The processor 1002 may store and retrieve data from the memory 1004 as a software program is executed. The location mapping data structure 1006 stores information mapping the home node serving each mobile device to the identity of that device. The processor 1002 accesses and updates the location mapping data structure 1006.

The home node gateway 1000 includes software which is configured to read Location Update messages that are sent to the home node gateway for communication to the core network. These Location Update messages are periodically generated by mobile devices attached to the home nodes served by the home node gateway 1000. As the home node gateway relays each message, it also has the opportunity to read the message. As each message is read, the identity of the sending mobile device is extracted. In some embodiments, this identity is an International Mobile Subscriber Identity (IMSI). After extracting the identity, the identity is associated with the sending home node and stored in the location mapping data structure 1006. In some embodiments, the location mapping data structure 1006 is also updated to disassociate the identity from home nodes which share a location identifier with the sending home node. In some embodiments, the location mapping data structure 1006 is a set of counting bloom filters. In these embodiments, each counting bloom filter is associated with a single home node and stores the set of mobile device identifiers which are associated with that home node. In some embodiments, the associations stored by the location mapping data structure 1006 are periodically flushed so that stale associations are cleared. The associations are gradually reestablished upon receipt of further Location Update messages.

The home node gateway 1000 additionally includes software which is configured to selectively forward paging requests based on the associations stored in the location mapping data structure 1006. Each time the home node gateway receives a paging request message from the core network, it extracts the identity of the mobile device that is being paged. By identifying the home nodes which are associated with that identity in the location mapping data structure, the home node gateway identifies a subset of home nodes that are likely to be presently serving the desired mobile device. The home node gateway then forwards the paging request message only to the subset of home nodes so identified.

User Equipment and Gateway

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The home node gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

Figure 11:
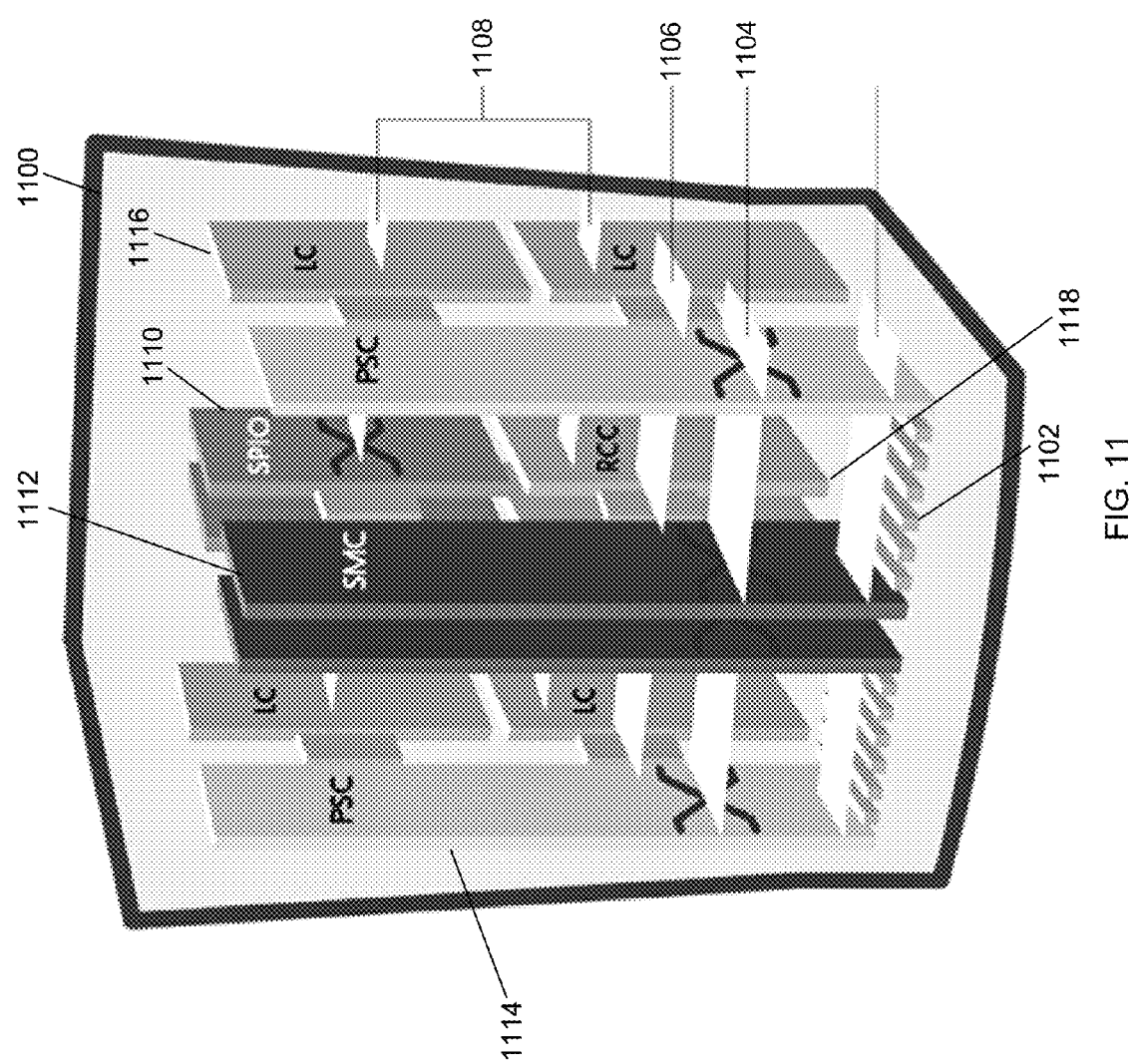
FIG. 11 illustrates a network device in accordance with some embodiments.

In certain embodiments, the functionalities are provided by a combination of hardware and software in the network device. General purpose hardware can be configured in the network device to provide one or more of these specialized functionalities. In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 11 illustrates the implementation of a network device in accordance with some embodiments. The network device 1100 includes slots 1102 for loading application cards and line cards. A midplane can be used in the network device to provide intra-network device communications, power connections, and transport paths between the various installed cards. The midplane can include buses such as a switch fabric 1104, a control bus 1106, a system management bus, a redundancy bus 1108, and a time division multiplex (TDM) bus. The switch fabric 1104 is an IP-based transport path for user data throughout the network device implemented by establishing inter-card communications between application cards and line cards. The control bus 1106 interconnects the control and management processors within the network device. The network device management bus provides management of system functions such as supplying power, monitoring temperatures, board status, data path errors, card resets, and other failover features. The redundancy bus 1108 provides transportation of user data and redundancy links in the event of hardware failures. The TDM bus provides support for voice services on the system.

The network device supports at least four types of application cards: a switch processor I/O card (SPIO) 1110, a system management card (SMC) 1112, a packet service card (PSC) 1114, and a packet accelerator card (not shown). Other cards used in the network device include line cards 1166 and redundant crossbar cards (RCC) 1118. The line cards 1116, when loaded in the network device, provide input/output connectivity to the network and other devices, as well as redundancy connections. The line cards 1116 include interfaces to the network through Ethernet, Fiber Optic, and the other communication mediums. The redundant crossbar card (RCC) 1118 includes a non-blocking crossbar and connections to each of the cards in the network device. This allows a redundant connection to be made through the redundant crossbar card 1118 from any one card to any other card in the network device. The SPIO card 1110 serves as a controller of the network device and is responsible for such things as initializing the network device and loading software configurations onto other cards in the network device.

The system management card (SMC) 1112 and switch processor card (not shown) are system control and management cards for managing and controlling other cards in the network device. The packet accelerator card (PAC) and packet service card (PSC) 1114 provide packet processing, context processing capabilities, and forwarding capabilities among other things. The PAC and PSC 1114 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 12:
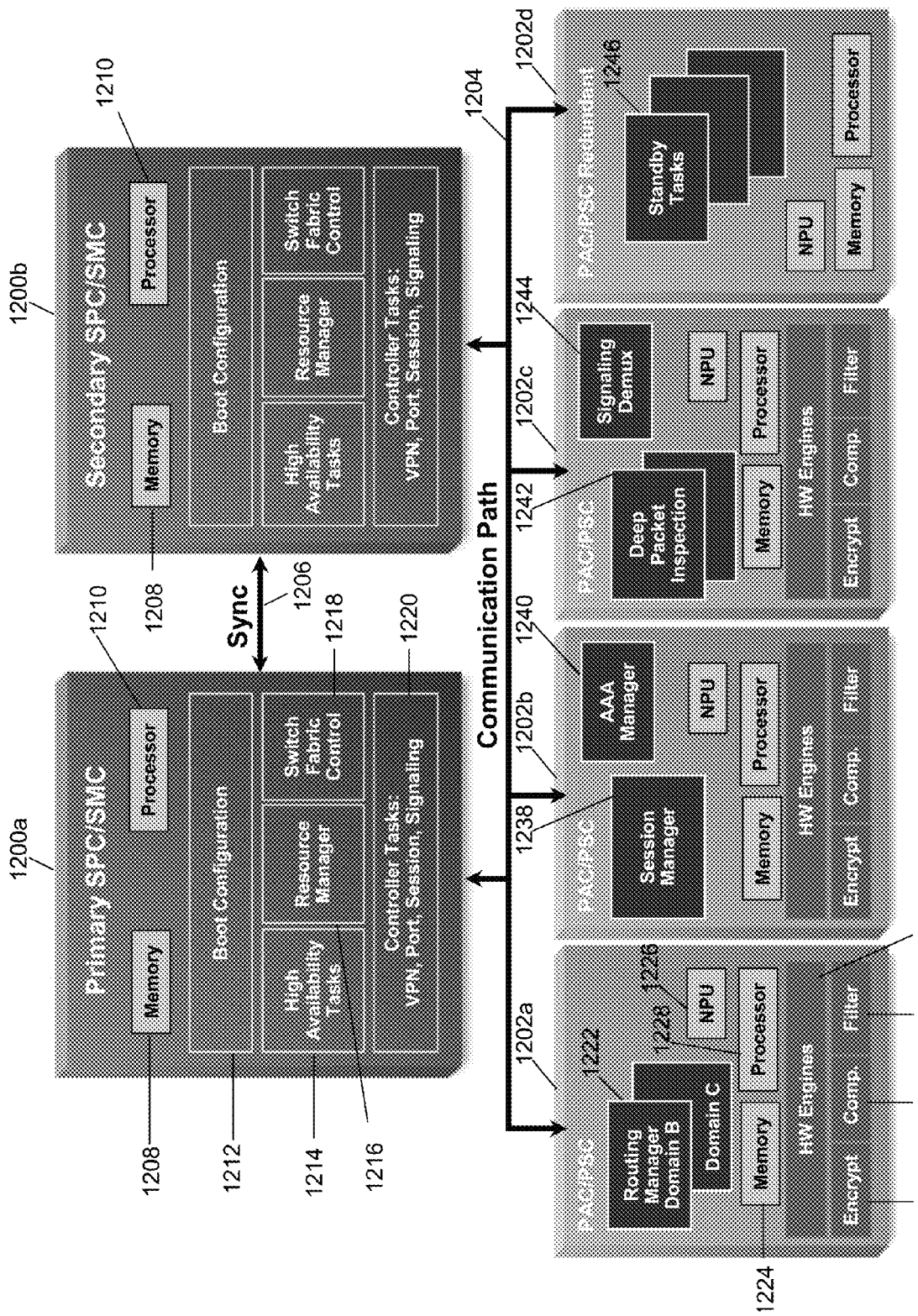
FIG. 12 illustrates a logical view of the software architecture of a network device in accordance with some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 12 illustrates a logical view of the software architecture of a network device in accordance with certain embodiments. As shown, the software and hardware can be distributed within the network device and across different circuit boards, processors, and memory. FIG. 12 includes a primary switch processor card (SPC)/system management card (SMC) 1200*a*, a secondary SPC/SMC 1200*b*, PAC/PSC 1202*a*-1202*d*, a communication path 1204, and a synchronization path 1206. The SPC/SMC 1200 include a memory 1208, a processor 1210, a boot configuration 1212, high availability tasks 1214, resource manager 1216, switch fabric control 1218, and controller tasks 1220.

The SPC/SMC 1200 manage and control the network device including the other cards in the network device. The SPC/SMC 1200 can be configured in a primary and secondary arrangement that provides redundancy and failsafe protection. The modules or tasks running on the SPC/SMC 1200 are related to network device wide control and management. The boot configuration task 1212 includes information for starting up and testing the network device. The network device can also be configured to startup in different configurations and providing different implementations. These can include which functionalities and services are capable of running on the SPC/SMC 1200. The high availability task 1214 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1200 or a PAC/PSC 1202, while some processor intensive tasks can also be performed across multiple PACs/PSCs to utilize multiple CPU resources. Distribution of these tasks is invisible to the user. The switch fabric control 1218 controls the communication paths in the network device. The controller tasks module 1220 can manage the tasks among the resources of the networks to provide, for example, VPN services, assign ports, and create, delete, and modify sessions for user equipment.

The PAC/PSC 1202 are high-speed processing cards that are designed for packet processing and the tasks involved with providing various network functionalities on the network device. The PAC/PSC 1202 include a memory 1224, a network processing unit (NPU) 1226, a processor 1228, a hardware engine 1230, an encryption component 1232, a compression component 1234, and a filter component 1236. Hardware engines 1230 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1202 is capable of supporting multiple contexts. The PAC/PSC 1202 are also capable of running a variety of tasks or modules. PAC/PSC 1202*a* provides routing managers 1222 with each covering routing of a different domain. PAC/PSC 1202*b* provides a session manager 1238 and an AAA manager 1240. The session manager 1238 manages one or more sessions that correspond to one or more user equipment. A session allows a user equipment to communicate with the network for voice calls and data. The AAA manager 1240 manages accounting, authentication, and authorization with an AAA server in the network. PAC/PSC 1202 provides a deep packet inspection task 1242 and a signaling demux 1244. The deep packet inspection task 1242 provides inspection of packet information beyond layer 4 for use and analysis by the network device. The signaling demux 1244 can provide scalability of services in combination with other modules. PAC/PSC 1202*d* provides redundancy through standby tasks 1246. Standby tasks 1246 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, home node gateways may store the UE/home node location mapping information in a list data structure.

We claim:

1. A method operable at a home node gateway in communication with a core network and with a plurality of home nodes, the method comprising:
   receiving, at the gateway, location information from a home node of the plurality of home nodes which indicates that a mobile device is attached to the home node;
   storing, at the gateway, the location information in one or more data structures, wherein the location information includes an identity of the mobile device and an identity of the home node; mapping, at the gateway, in the one or more data structures the identity of the mobile device to the identity of the home node;
   receiving, at the gateway, a paging request message which contains the identity of a desired mobile device, wherein the paging request message requests the gateway to page the desired mobile device;
   identifying, at the gateway, one or more associated home nodes through the mapping with the identity of the desired mobile device, wherein the paging request message contains information other than the identity of the desired mobile device which narrows the possible home nodes to which the desired mobile device is attached, and the one or more associated home nodes are a proper subset of the possible home nodes; and
   forwarding, from the gateway, the paging request message to the one or more associated home nodes.

2. The method of claim 1, wherein the location information is received in a location update message that was sent by the mobile device to the home node and forwarded to the gateway by the home node.

3. The method of claim 1, wherein the gateway is a home node B gateway.

4. The method of claim 2, further comprising updating the one or more data structures to remove any association between the identity of the mobile device and one or more neighboring home nodes, the one or more neighboring home nodes and the home node sharing a location identifier.

5. The method of claim 4, wherein each of the one or more data structures is periodically flushed of all associations at pre-determined time intervals.

6. The method of claim 1, wherein each of the one or more data structures is a counting bloom filter.

7. The method of claim 1, further comprising:
   sub-dividing each of the one or more data structures into two or more sub-data structures, wherein the data stored by each of the one or more data structures comprising the union of the data stored by each of the two or more sub-data structures of that data structure;
   flushing each of the two or more sub-data structures at a staggered time interval;
   and storing in each of the two or more sub-data structures the location information received in the time interval beginning after that sub-data structure is flushed.

8. The method of claim 7, wherein each of the two or more sub-data structures is a counting bloom filter.

9. The method of claim 1, wherein the identity of the mobile device is an International Mobile Subscriber Identity.

10. The method of claim 1, wherein each of the home nodes is a home node B.

11. A home node gateway comprising:
    an interface that is configured to provide communication with a core network and to receive location information from a plurality of home nodes, including information which indicates that a mobile device is attached to a home node of the plurality of home nodes;
    a memory that is configured to store a module; and
    a processor that is configured to run the module stored in memory to store the location information that includes an identity of the mobile device and an identity of the home node in one or more data structures and to map in the one or more data structures the identity of the mobile device to the identity of the home node, to receive a paging request message which contains the identity of a desired mobile device, identify one or more associated home nodes through the mapping with the identity of the desired mobile device, and forward the paging request message to the one or more associated home nodes, wherein the paging request message requests the home node gateway to page the desired mobile device, and wherein the paging request message contains information other than the identity of the desired mobile device which narrows the possible home nodes to which the desired mobile device is attached, and the one or more associated home nodes are a proper subset of the possible home nodes.

12. The home node gateway of claim 11, wherein the location information is received in a location update message that was sent by the mobile device to the home node and forwarded to the home node gateway by the home node.

13. The home node gateway of claim 12, wherein the one or more data structures is updated to remove any association between the identity of the mobile device and one or more neighboring home nodes, the one or more neighboring home nodes and the home node sharing a location identifier.

14. The home node gateway of claim 13, wherein each of the one or more data structures is periodically flushed of all associations at pre-determined time intervals.

15. The home node gateway of claim 11, wherein each of the one or more data structures is a counting bloom filter.

16. The home node gateway of claim 11, wherein each of the one or more data structures is sub-divided into two or more sub-data structures, the data stored by each of the one or more data structures comprising the union of the data stored by each of the two or more sub-data structures of that data structure, each of the two or more sub-data structures being flushed at a staggered time interval and each of the two or more sub-data structures storing the location information received in the time interval beginning after that sub-data structure is flushed.

17. The home node gateway of claim 16, wherein each of the two or more sub-data structures is a counting bloom filter.

18. Logic encoded on one or more non-transitory computer-readable media and when executed at a gateway in communication with a core network and with a plurality of home nodes operable to:
    receive, at the gateway, location information from a home node of the plurality of home nodes which indicates that a mobile device is attached to the home node;
    store, at the gateway, the location information in one or more data structures, wherein the location information includes an identity of the mobile device and an identity of the home node;
    map, at the gateway, in the one or more data structures the identity of the mobile device to the identity of the home node;
    receive, at the gateway, a paging request message which contains the identity of a desired mobile device, wherein the paging request message requests the gateway to page the desired mobile device;

identify, at the gateway, one or more associated home nodes through the mapping with the identity of the desired mobile device, wherein the paging request message contains information other than the identity of the desired mobile device which narrows the possible home nodes to which the desired mobile device is attached, and the one or more associated home nodes are a proper subset of the possible home nodes; and forward, from the gateway, the paging request message to the one or more associated home nodes.

* * * * *